United States Patent [19]
Franckx

[11] Patent Number: 5,607,167
[45] Date of Patent: Mar. 4, 1997

[54] SEALING MEMBER HAVING CONCENTRIC O-RING RETAINER FILLED WITH GEL SEALANT

[75] Inventor: Joris I. Franckx, Bonheiden, Belgium

[73] Assignee: N.V. Raychem S.A., Kessel-Lo, Belgium

[21] Appl. No.: 397,161

[22] PCT Filed: Aug. 25, 1993

[86] PCT No.: PCT/GB93/01809

§ 371 Date: Apr. 28, 1995

§ 102(e) Date: Apr. 28, 1995

[87] PCT Pub. No.: WO94/05935

PCT Pub. Date: Mar. 17, 1994

[30] Foreign Application Priority Data

Sep. 4, 1992 [BE] Belgium ................ 9218755.8
Apr. 1, 1993 [BE] Belgium ................ 9306855.9

[51] Int. Cl.$^6$ ............... F16J 15/10; G02B 6/44; G02B 6/38
[52] U.S. Cl. ............... 277/72 FM; 277/208; 277/209; 174/65 SS; 174/77 R
[58] Field of Search ............... 277/180, 188 A, 277/188 R, 189, 135, 226, 227, 72 FM, 208, 209; 174/65 SS, 65 R, 76, 77 R; 439/587, 589, 271–277, 936

[56] References Cited

U.S. PATENT DOCUMENTS

| | | | |
|---|---|---|---|
| 368,189 | 8/1887 | Carter | 277/180 |
| 3,521,892 | 7/1970 | Sheesley et al. | 277/180 |
| 3,542,382 | 11/1970 | Hagmann | 277/180 |
| 4,441,724 | 4/1984 | Taylor | 277/180 |
| 4,600,261 | 7/1986 | Debbaut . | |
| 4,643,924 | 2/1987 | Uken et al. . | |
| 4,680,233 | 7/1987 | Camin et al. . | |
| 4,718,678 | 1/1988 | Vansant . | |
| 4,751,350 | 6/1988 | Eaton . | |
| 4,830,182 | 5/1989 | Nakazato et al. . | |
| 4,849,580 | 7/1989 | Reuter . | |
| 4,900,877 | 2/1990 | Dubrow et al. . | |
| 4,962,938 | 10/1990 | Cooper | 277/72 FM |
| 4,993,720 | 2/1991 | Ciotola | 277/72 FM |
| 5,059,748 | 10/1991 | Allen et al. | 174/93 |
| 5,137,283 | 8/1992 | Giarrusso et al. . | |
| 5,226,837 | 7/1993 | Cinibulk et al. . | |
| 5,360,945 | 11/1994 | Truesdale, Jr. et al. | 174/65 SS |
| 5,390,939 | 2/1995 | Terauchi et al. | 277/180 |

FOREIGN PATENT DOCUMENTS

| | | |
|---|---|---|
| 0159857A3 | 10/1985 | European Pat. Off. . |
| 0319305A2 | 6/1989 | European Pat. Off. . |
| 3216057A1 | 11/1983 | Germany . |
| 8436908.6 | 7/1986 | Germany . |
| 194074 | 8/1987 | Japan ................ 277/180 |
| 238972 | 7/1994 | New Zealand . |
| 1559251 | 1/1980 | United Kingdom . |
| WO86/06561 | 11/1986 | WIPO . |
| WO89/11608 | 11/1989 | WIPO . |

OTHER PUBLICATIONS

Parker O–Ring Handbook; catalog 5700; Jul. 1957; pp. 2–3 to 2–13.

*Primary Examiner*—Scott Cummings
*Attorney, Agent, or Firm*—William D. Zahrt II; Herbert G. Burkard

[57] ABSTRACT

A sealing member having: a sealing material having a cone penetration between 80 and 400 ($10^{-1}$ mm) and an ultimate elongation of at least 100%, and an elastomeric retaining member for the sealing material. The retaining member in the form of two connected concentric O-rings.

16 Claims, 2 Drawing Sheets

SEALING MEMBER HAVING CONCENTRIC O-RING RETAINER FILLED WITH GEL SEALANT

The present invention relates to environmental sealing, especially to a sealing member, particularly for cable accessories for example housings such as cable splice closures.

Environmental sealing is frequently necessary in the cables accessories arts in order to keep out contaminants such as water and sometimes to retain pressure. When cables are spliced, for example, cable jackets must be removed in order to expose conductors for connection. Some form of closure must be created around the otherwise exposed conductors to replace the removed cable jacket. Such splice closures must have a lifetime under adverse conditions comparable to that of the cables themselves, which may be twenty years or so. Thus, the problem of environmental sealing is far from trivial.

The present invention will find uses in many fields, but it is expected to be particularly useful for sealing optical fibre splice closures and other cable or pipe accessories. Cable splice closures often must be installed under wet or muddy conditions, and it is desirable that a good seal can be achieved without the need for rigourous cleaning of the surfaces to be sealed.

An optical fibre closure where the invention is expected to find particular use is disclosed in European Patent Specification No. 0159857 (Raychem). That specification discloses an assembly capable of enclosing a butt splice between at least two optical fibre cables, which comprises:

a hollow article comprising a base plate and a hollow cover disengageable from the base plate, the base plate having at least two mutually adjacent outlets capable of receiving respective optical fibre cables; the assembly having at least one optical fibre organizer housed within the article for storing a plurality of optical fibres in a path from one of the outlets to another of the outlets, said path having a minimum radius of curvature no smaller than the minimum bend radius of said optical fibres; and first means for connecting the base plate to the hollow cover and second means for connecting the at least one optical fibre organizer to the base plate such that when the first and second means are so connected the optical fibres are stored in at least one storage plane and characterized in that when the first means is disconnected the hollow cover is removeable from the base plate by being moved along a direction which is substantially parallel to the storage plane, substantially parallel to each outlet direction at the base plate and substantially perpendicular to the base plate.

The base plate and cover, which is preferably dome-shaped, may be held together by some mechanical clamp, optionally together with some environmental sealing means such as a gasket, O-ring, mastic seal or adhesive bond.

The use of O-rings in such a device is, of course, well known. They allow easy re-entry into the closure and easy re-sealing, they can withstand high pressures within the closure, and they do not suffer from compression set.

We have, however, become aware of certain disadvantages of the use of simple O-rings. For example, the force that they are subjected to and the consequential extent of their distortion are critical if a good seal is to be obtained. The forces required are generally high, and as a result the article to be sealed must be strong and, therefore, generally thick-walled. In the case of an optical fibre closure as disclosed above, this means that the base and at least the lower skirt of the dome cover must be ruggedly constructed. A further disadvantage is that both the O-ring and the surfaces of the base and dome to be sealed, must be carefully cleaned and must be free from scratches or moulding flash etc. Dimensional changes resulting from pressure, heat or excessive mechanical loads might prevent a good seal being achieved and performance at low temperatures is unlikely to be satisfactory due to loss of elastomeric properties of the materials from which most O-rings are made.

We have discovered that such disadvantages of O-rings can be avoided if an O-ring, or other retaining member, is used in conjunction with a suitable sealing material. This new combination produces surprising benefits not apparent from either component when used separately. This might be due to the ability of the retaining member to store energy, as discussed below.

Thus, the present invention provides a sealing member comprising:

(a) a sealing material having a cone penetration between 80 and 400 ($10^{-1}$ mm) and an ultimate elongation of at least 100%, and (b) an elastomeric retaining member for the sealing material.

Cone penetration and ultimate elongation are measured in accordance with American National Standard Designations ASTM-D217 and ASTM-D638.

The cone penetration is preferably at least 100, more preferably at least 120, and preferably less than 350, and in particular less than 200($10^{-1}$ mm). Ultimate elongation is preferably at least 200, more preferably at least 400%.

Various materials may be used as the sealing material, but we prefer a gel. Gels have various advantages, for example they can be highly conformable at room temperature since they can have an almost liquid-like flexibility that allows them to conform to the substrate to be sealed. They have a cross-linked structure which gives them elasticity, cohesive strength, and form stability. The cross-linked structure may result from cross-linking chemical bonds, as in the case of a silicone or polyurethane gel, or it may result from the formation of crystalline regions as in the case of thermoplastic gels such as those based on block copolymers. In any case, the gel will comprise some form of three-dimensional polymer network, extended by means of an oil or other material. Gels are disclosed in U.S. Pat. No. 4,600,261, the disclosure of which is incorporated herein by reference.

We prefer that the gel be pre-cured, or its three-dimensional structure otherwise formed, away from the substrate to be protected. We have found that this is preferable to the components of a gel being poured between the surfaces to be sealed, and then cured. Thus, we are able to pre-form a sealing member which can be easily handled and stored before being positioned for example between the base and dome of an optical fibre closure.

The O-ring, or other retaining member, preferably allows the sealing member to be put under compression along one direction (for example along the direction along which the dome and base of a splice closure are brought together), but restricts consequential displacement of the sealing material in a perpendicular direction. The retaining member preferably has the function of storing energy applied when the parts to be sealed are brought together. Thus, slight displacement of the sealing material can be compensated for by subsequent relaxation of the retaining member. In this way the sealing material can be retained under compression, thereby preventing the formation of leak paths.

Any suitable material may be used as the elastomeric retaining member, but we prefer a rubber such as a natural rubber, silicone rubber, nitrile rubber, EPDM rubber or neoprene rubber. The material of the retaining member preferably has a Shaw A hardness of from 30 to 80, preferably 40 to 70, more preferably 50 to 60.

The retaining member may comprise an O-ring, and we prefer that it comprise two substantially concentric O-rings, an annular space between them containing the sealing material. The two O-rings may be joined to one another, for example by an annular web, in which case the sealing material may be provided on each surface of the web.

The retaining member may be hollow, thereby being pneumatically compressible. Energy can then be stored as pressurized gas as well as or instead of deformation of the material of the retaining member itself.

It might be desirable to provide means by which the sealing material can be held on the retaining member, and to this end the retaining member may have a surface provided with indentations or protrusions or treated to aid bonding between sealing material and retaining member.

As mentioned above the sealing member of the invention can be used in the environmental protection of an optical fibre closure, and the invention therefore also provides an optical fibre or other cable splice closure, or other housing, that comprises:

(1) a first part having a first surface;

(2) a second part having a second surface, which second surface can be brought towards the first surface to close the housing; and (3) a sealing member of the invention that can be positioned between the first and second surfaces such that movement of the first and second surfaces together puts the sealing member under compression and causes the retaining member to contact each of the first and second surfaces.

The housing may additionally comprise:

(4) means for maintaining the first and second surfaces in contact with the retaining member.

Where the housing comprises an optical fibre splice closure, it may contain one or more trays or other optical fibre organizers preferably at the base, and more preferably pivotally attached to the base. The base may have one or more outlets for receiving cables to be spliced, and the cables may be sealed in their outlets by any suitable means, for example by means of heat-shrinkable tubing.

The invention is further illustrated with reference to the accompanying drawings, in which.

Figure 1:
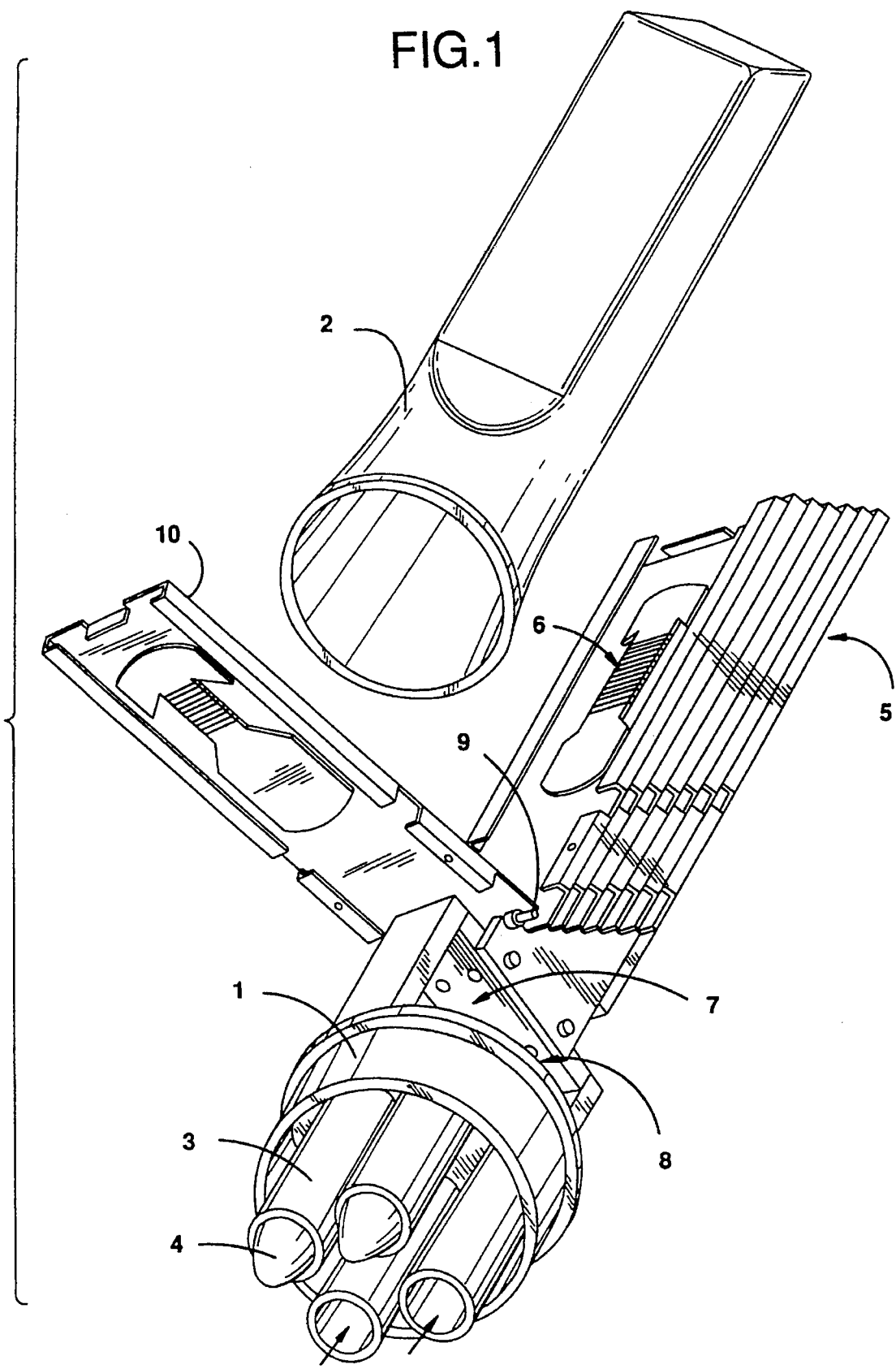
FIG. 1 shows a prior art optical fibre splice closure.

FIG. 1 shows an optical fibre splice closure disclosed in EP 0159857. A base plate 1 and a dome-shaped cover 2 together form an enclosure for use as a butt splice case for optical fibre cables. The base 1 is preferably manufactured by moulding from a glass fibre filled high density polyethylene or polypropylene. Outlets 3 may be provided in the base through which cables pass. On a new installation, some only of the outlets 3 may be required, and some may therefore be temporarily blocked as shown at 4. That blocking may be by any suitable means, but we prefer that the outlet be made with closed ends which are simply cut off as required. The dome-shaped cover may be blow moulded and may incorporate a moisture-vapour barrier such as a metal foil.

The hollow article contains an optical fibre organizer which comprises a series of trays 5. Each tray preferably includes means 6 for accommodating splice tubes which house fibre splices. The trays are preferably held in an orderly fashion on a carrier 7 which is fixed to the base 1. The trays are shown hinged along their short edges, but other hinging for example pivoting or rotation eg about one corner in the plane of the trays could be provided. The hinging allows chosen trays to be exposed for installation of the splices or for repair. Means is preferably also provided for locking trays in a hinged position.

The assembly of the invention may be used as follows. Firstly, pass the two cables to be spliced in the direction of the arrows through two of the outlets 3 such that, say, 1.5 meters of each cable protrudes into the splice case. The cable jackets are then removed back to the base 1 to expose 1.5 meters of fibres. The strength core of each cable is then cut back, leaving enough remaining for it to be fastened into respective fastening holes 8. Each fibre of one cable is then spliced to the correct fibre of the other cable. Single fibres, pairs of fibres, or groups of say 10 or 12 splice fibres may then be stored on each tray. When one tray is filled it is moved by hinging at 9 to expose another tray. Each tray preferably has a rim 10 to ensure a sufficient separation between adjacent trays and/or to prevent fibre slippage from each tray. The splice closure may additionally or alternatively enclose fibre splitters.

Figure 2A:
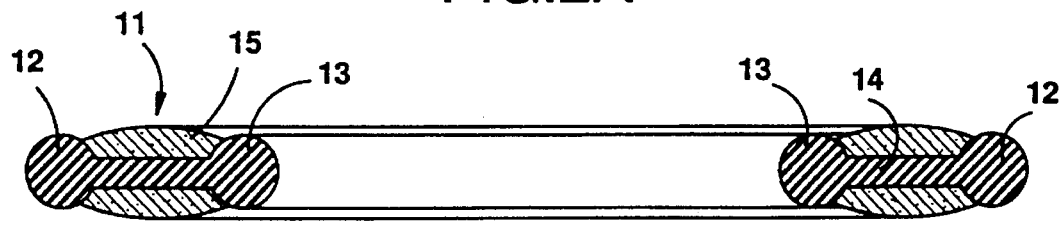
FIGS. 2A and 2B show installation of a sealing member according to the invention.
Figure 2B:
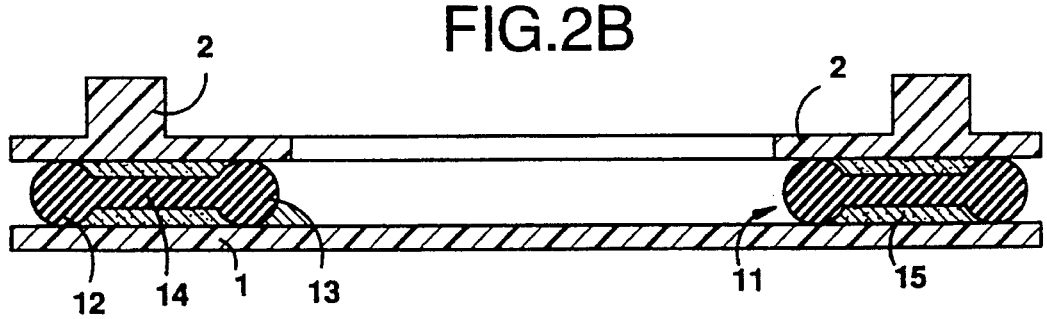
Figure 3:
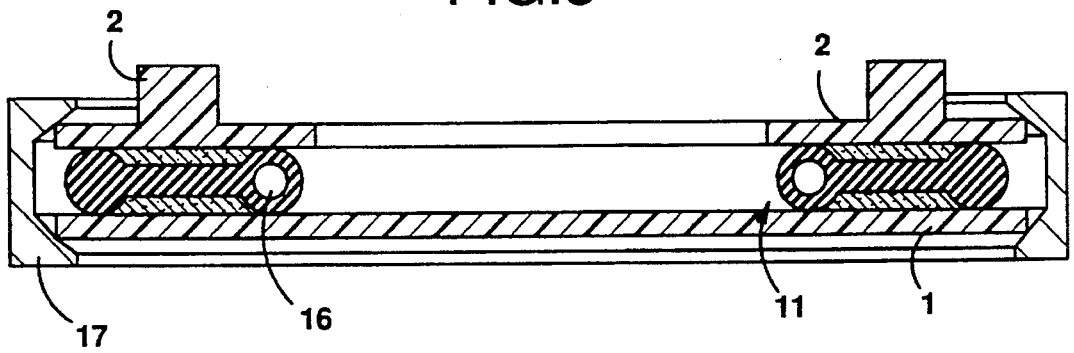
FIG. 3 shows an alternative design of sealing member.

Sealing members of the invention are shown in FIGS. 2 and 3, and these sealing members may be used in a splice closure as illustrated in FIG. 1 in particular to form an environmental seal between the base 1 and the dome-shaped cover 2.

FIG. 2A shows a sealing member before installation, and FIG. 2B shows such a sealing member forming an environmental seal between a base 1 and dome-shaped cover 2. The base 1 is shown for convenience without its outlets 3, and the cover 2 is only partially shown.

The sealing member 11 comprises two substantially concentric O-rings 12, 13 joined together, preferably integrally, by means of a web 14 extending annularly between them. A gel or other sealing material 15 is positioned between the O-rings above and below the annular web 14. The sealing material 15 can be seen to extend slightly proud of opposing surfaces of the retaining member (here above and below the top and bottom extremities of the O-rings). Thus, when the dome 2 and base 1 are brought together with the sealing member between them, the sealing material 15 is put under compression as shown in FIG. 2B. The O-rings 12 and 13 prevent or restrict displacement of sealing material 15 in a lateral direction as drawn, ie in a radial direction in the case of a splice closure such as that shown in FIG. 1; and energy applied can be at least partially stored by deformation of the O-rings, for example by causing each O-ring to become oblate in cross-section, and/or by radial expansion of the outer ring and/or radial compression of the inner ring. Creep or compression set of the sealing material during service life can therefore be compensated for at least in part by relaxation of the retaining member.

The sealing member shown in FIG. 3 comprises two O-rings with a sealing material between them, the annular web of FIG. 2 being omitted. Also shown in FIG. 3 is a circular clamp 17, usually formed in two halves hinged together that can be applied around the circumference of the base and dome to draw them together. Means may be provided to maintain the parts of the clamp 17 biased towards one another thus maintaining the sealing material 15 under compression. This means (as well as or instead of the retaining member) may store energy and compensate for creep etc of the sealing material during service of the closure. One of the O-rings shown in FIG. 3 is hollow as shown at 16. In this way the O-ring can be pneumatically compressible. Both O-rings may, of course, be hollow.

A low compression force is sufficient to form a seal, and once a seal has been achieved a wide range of compression forces and a wide range of relative positions between dome 2 and base 1 can be taken up without destroying the seal. Small irregularities in the shape of the dome and base and of the seal itself can be tolerated, and the various surfaces need not be rigourously cleaned before installation. The gel preferably wets the surface of the base and the dome since a better seal results. The risk of excessive movement of base and dome or of excessive pressure is avoided by the use of the O-rings or other retaining member, and as a result excessive creepage of the gel is avoided. Also, over compression of the gel can be avoided because the elastic modulus of the O-ring may be considerably higher than that of the gel.

I claim:

1. A sealing member comprising:
   (a) a sealing material having a cone penetration of between 80 and 400 ($10^{-1}$ mm) and an ultimate elongation of at least 100%, and
   (b) an elastomeric retaining member for the sealing material, which retaining member comprises two substantially concentric O-rings which are joined to one another, an annular space between the O-rings containing the sealing material.

2. A sealing member according to claim 1, in which the sealing material comprises a gel.

3. A sealing member according to claim 1, in which the retaining member allows the sealing material to be put under compression along one direction but restricts its consequential displacement in a perpendicular direction.

4. A sealing member according to claim 1, in which the retaining member has a Shore A hardness of 40 to 70.

5. A sealing member according to claim 2, in which the retaining member allows the sealing material to be put under compression along one direction but restricts its consequential displacement in a perpendicular direction.

6. A sealing member according to claim 2, in which the retaining member has a Shore A hardness of 40 to 70.

7. A sealing member according to claim 3, in which the retaining member has a Shore A hardness of 40 to 70.

8. A sealing member according to claim 1, in which the O-rings are joined by an annular web, the sealing material being provided on opposite surfaces of the web.

9. A sealing member according to claim 1, in which the retaining member is hollow and pneumatically compressible.

10. A sealing member according to claim 8, in which the retaining member is hollow and pneumatically compressible.

11. A housing which comprises:
    (1) a first part having a first surface;
    (2) a second part having a second surface, which second surface is, in use, brought towards the first surface to close the housing; and
    (3) a sealing member which comprises (a) a sealing material having a cone penetration of between 80 and 400 ($10^{-1}$ mm) and an ultimate elongation of at least 100%, and (b) an elastomeric retaining member for the sealing material, which retaining member comprises two substantially concentric O-rings which are joined to one another, an annular space between the O-rings containing the sealing material, which sealing member is positioned, in use, between the first and second surfaces such that movement of the first and second surfaces together puts the sealing member under compression and causes the retaining member to contact each of the first and second surfaces.

12. A housing according to claim 11 which additionally comprises:
    (4) means for maintaining the first and second surfaces in contact with the retaining member.

13. A housing according to claim 11, being a cable splice closure, the first part comprising a base having cable outlets, and the second part comprising a cover for the base.

14. A housing according to claim 13, being an optical fibre splice closure having an optical fibre organizer at the base.

15. A housing according to claim 12, being a cable splice closure, the first part comprising a base having cable outlets, and the second part comprising a cover for the base.

16. A housing according to claim 15, being an optical fiber splice closure having an optical fiber organizer at the base.

* * * * *